United States Patent [19]

Kuehn, III et al.

[11] 4,392,782
[45] Jul. 12, 1983

[54] LIQUID LEVEL CONTROLLER

[75] Inventors: Andrew Kuehn, III, St. Paul, Minn.; Edwin G. Hoefs, Dallas, Tex.

[73] Assignee: Comact Pump Corporation, Dallas, Tex.

[21] Appl. No.: 206,669

[22] Filed: Nov. 13, 1980

[51] Int. Cl.$^3$ ............................................. F04B 49/06
[52] U.S. Cl. .................................... 417/36; 307/118; 417/44; 417/53; 417/63
[58] Field of Search ...................... 417/32, 36, 44, 63, 417/14, 53; 307/118; 137/392, 395

[56] References Cited

U.S. PATENT DOCUMENTS

| | | | |
|---|---|---|---|
| 2,975,347 | 3/1961 | Schaefer | 417/36 X |
| 3,223,041 | 12/1965 | Quinn | 417/36 X |
| 3,771,548 | 11/1973 | Rauchwerger | 137/392 |
| 4,325,894 | 4/1982 | Date et al. | 137/392 X |

Primary Examiner—Edward K. Look
Attorney, Agent, or Firm—Joseph H. Schley; Thomas L. Cantrell; Stanley R. Moore

[57] ABSTRACT

Disclosed is a liquid level controller that uses a pair of vertically spaced thermistors to control a switching means to turn a pump on when a sufficient depth of liquid is present and to turn the pump off before the pump runs dry. Such a device is ideally suited for applications such as "stripper" oil wells. The present invention uses thermistors in the self heat mode and senses the changes in the resistance between a thermistor exposed to air and one submerged in liquid, the latter increasing resistance because it is far more efficient in transferring away heat generated by the thermistor. The change of resistance when the liquid level covers the higher of the thermistors is detected by the use of comparators which selectively turn on a driving transistor. Turning the transistor on activates a coil which throws a relay switch and activates the control circuitry of the pump motor. The change in resistance when the liquid level drops below the lower of the thermistors is similarly detected by the use of comparators which turn off the driving transistor, deactivating the control circuitry of the pump. Further, provisions are disclosed to automatically turn the pump off in the event that the thermistor or their leads are damaged.

13 Claims, 4 Drawing Figures

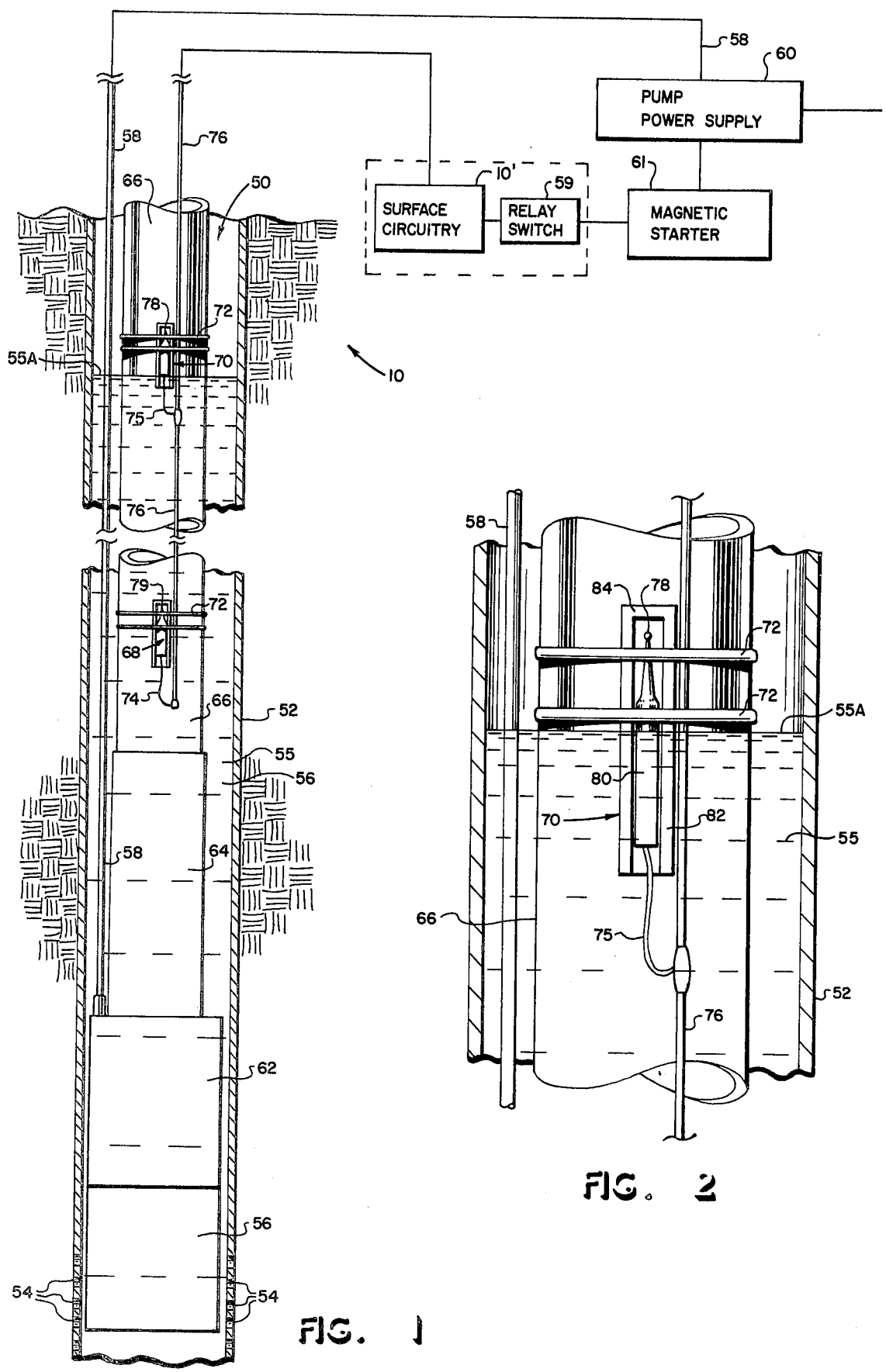

LIQUID LEVEL CONTROLLER

BACKGROUND

There are many applications where it is necessary to control the level of a contained liquid between distinct upper and lower limits. Some examples are tankage in sewer works, water supply systems, and chemical and other processing industries. One particularly tough problem is removing oil as it collects in the well hole of a "stripper well". This last application will be discussed as an example of a liquid level controller throughout the specification.

The flow rate of many oil wells is far too slow to efficiently match with a continuous pumping speed to extract the oil as it seeps into the well. These wells, often called "stripper" wells, must be pumped intermittently to allow the oil to collect between pumpings. In such cases some provision must be made to turn the pumping device on when a quantity of oil has seeped into the bore and collected there to present a column of oil above the pumping mechanism of sufficient depth to economically warrant extraction. The pump should then run until most of the oil has been pumped to the surface, but must shut off before evacuating all the collected oil. It is very important to shut the pump off because running the pump dry will lead to rapid pump failure. For example, down-hole progressive cavity pumps will overheat and destroy their rubber seals and traditional walking beam pumps transmit devasting shocks throughout the entire pump when the down-hole pump mechanism begins to reciprocate at the surface of the oil. The compressible nature of air and the increased friction of running without the lubrication of a flow of oil are both serious contributing factors to pump failure if the pump is allowed to run dry.

The current common practice is to try to balance the pumping cycle with the flow of oil through a timing circuit. At selected intervals the pump runs for a predetermined period of time. The spacing between the intervals and the duration of each pumping period are adjusted to try to match the flow characteristics of the well. However any imbalance creates an error that is increased with each successive pumping cycle. Further, the flow characteristics of the well can change, and even if not, this imperfect approximation requires substantial man hours in calibrating and checking the system. A further disadvantage of the fixed timing cycles are that they favor collecting a relatively substantial column of oil before the pump is turned on. Extraction of large quantities of collected oil minimizes the proportion of pumping time during which the surface of the oil is nearest the pump mechanism. However, such a relatively tall column of oil has substantial weight and the pressure head developed inhibits the flow of oil from the reservoir into the well hole.

Thus it is clear that there is a present need to develop a detection system that will cut the pump on and off as a function of the actual oil level rather than as a function of where someone has anticipated the oil level should be at a given time. Such a system must quickly respond to changes of oil level and should be highly reliable in order to operate for extended periods without supervision. Further this liquid level controller must be able to control the pump even if the pump itself is distant from the pump mechanism at the oil level. A walking beam pump is an example of this kind of pump. A similar problem is presented by down-hole pumps such as a progressive cavity pump because the present control circuitry is on the surface. The present invention satisfies each of these needs and brings additional advantages to this application.

SUMMARY OF THE INVENTION

The liquid level controller of the present invention detects changes in voltage that result from resistance response of two vertically disposed down-hole thermistors. The lower of these thermistors is positioned slightly above the level of the oil intake for the pump and is used to detect the oil level at which the pump must be shut off to avoid running dry. The higher of the thermistors detects the oil level at which the pump should be turned on to pump a column of collected oil to the surface. Both thermistors are operated in the self heating mode and the resistance of each varies with its temperature. The temperature of the thermistor indicates whether it is submerged in oil because the oil cools the thermistor by drawing away the heat internally generated at a much greater rate than the same thermistor dissipates heat when exposed to air of the same termperature as the liquid.

These changes in resistance are used to create voltage changes which are compared with control or reference voltage inputs by two comparators, each sensing off one of the thermistors. These comparators, in turn, determine the operational state of a third comparator which directly operates a switching means for controlling the operation of a relay system by which the liquid level controller interfaces with the circuitry driving the pump.

It is also preferred that a fourth comparator be deployed to shut the pump off should a break in one of the thermistors or their leads be detected.

A BRIEF DESCRIPTION OF THE DRAWINGS

FIG. 1 illustrates a plan view of down-hole equipment with a portion of the well casing broken away to expose that equipment and a schematic representation of the surface equipment in an application deploying the present invention;

FIG. 2 is an enlargement of a portion of FIG. 1 illustrating a thermistor assembly.

DETAILED DESCRIPTION OF THE DRAWINGS

Figure 3:
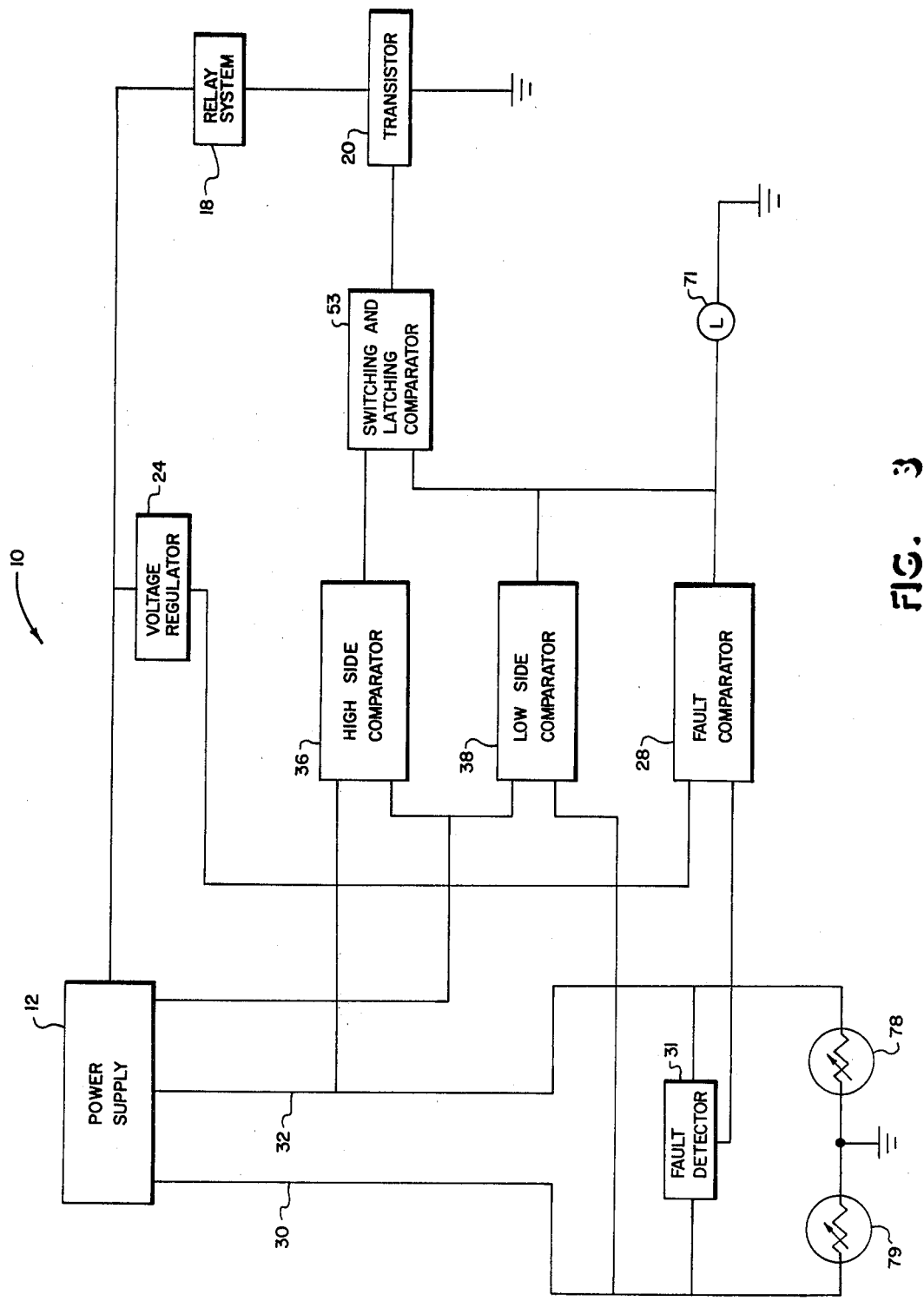
FIG. 3 is a schematic block diagram of a liquid level controller constructed in accordance with the present invention.

FIGS. 1 and 2 illustrate the use of a liquid level control system in a stripper well application. Here well casing 52 lines hole 50. Well casing 52 has perforations 54 in its lower extremity through which oil 55 seeps into the well hole from the formation. Down-hole motor 56 is powered by cable 58 by which it is connected to pump power supply 60 at the surface. The output of motor 56 enters transmission 62 where it is altered to become an appropriate input for pump 64. Pump 64 draws collected oil and pumps it through pipe 66 to the surface.

Thermistor assemblies 68 and 70 are strapped by nylon bands 72 to the outside of pipe 66 at a vertically displaced interval.

The low side thermistor assembly 68 is positioned above the intake for pump 64. It has leads 74 which are spliced to thermistor cable 76. The low side thermistor assembly is used to sense the oil level dropping too near the pump intake and to provide that information to the remainder of liquid level control system 10 which operates to shut off the pump.

The oil seeps into the well hole between pumping periods and a column of oil rises around the motor, transmission, pump and pipe 66, contained between these and well casing 52. High side thermistor assembly 70 is positioned an appropriate increment above the low side thermistor to bound a sufficient amount of collected oil 55 to warrant pumping to the surface. The high side thermistor is used to sense the oil rising above it and to forward this information in a useful form to the remainder of the liquid level controller, surface circuitry 10'.

FIG. 2 is a close up of the high side thermistor assembly. It is convenient that the low side thermistor be of the same construction. In the preferred embodiment, the actual thermistor element used is a glass bead thermistor, shown in this figure as thermistor element 78. Thermistor 78 is typically provided with cartridge 80 for protection. Cartridge 80 is fixed in mount 82 which protects the thermistor when pipe 66 is lowered into well hole 50. Note also that mount 82 has hood 84 which shelters thermistor 78 from oil that adheres to the surface of pipe 66 when the oil level drops.

Without hood 84, oil draining down the exterior surface of pipe 66 could sufficiently wet thermistor 79 of the low side thermistor assembly to make the low side thermistor sense it is submerged, when in fact, the oil level has dropped below it and the pump is threatened. Leads 75 of the high side thermistor are spliced into thermistor cable 76 which carries the thermistor line to the remainder of the liquid level control system which is preferably and coveniently located at the surface.

The thermistors are used in the self heating mode. In this manner the temperature of the thermistor is related to how rapidly the heat internally generated is dissipated into the cooler environment. The heat transfer properties of oil are markedly superior those of air and this allows an equilibrium temperature for a self heating thermistor in oil to be cooler than the equilibrium temperature in air. The resistance of the thermistor is related to the temperature and this property is used to develop, transmit and use information concerning the level of the liquid.

FIG. 3 is a simplified schematic block diagram of a liquid level controller here generally designated as 10, constructed in accordance with the present invention.

Power is provided to the liquid level controller by power supply 12 which has four outputs, the first of which is connected to the input side of voltage regulator 24 and to one side of relay system 18, the other side of the latter leading to power supply common, (indicated as ground in the drawing and sometimes refered to as ground hereinafter) through transistor 20. A second output of power supply 12 carries a reference or control voltage which is input to high side comparator 36 and to low side comparator 38, and the third and fourth outputs are essentially constant current and are connected to leads 30 and 32, respectively. Lead 30 in connected to low side comparator 38 as the varying input, to detector 31 as one of two inputs, and to ground through low side thermistor 79. Lead 32 is similar in that it is connected to high side comparator 36 as the varying input, to fault detector 31 as the second of two inputs, and to ground through high side thermistor 78.

The output of fault detector 31 is connected to fault comparator 28 where it is received as the variable of two inputs. In addition, fault comparator 28 is connected to voltage regulator 24 to receive the output of the voltage regulator as a reference voltage input. The output of the fault comparator is connected to ground through lamp 71 and to switching and latching comparator 53 as one of two inputs.

Switching and latching comparator 53 is connected to low side comparator 38 in such a manner that the output of the low side comparator joins the output of the fault comparator as the first of two inputs in the switching and latching comparator. The switching and latching comparator is further connected to high side comparator 36 in order to receive the output of the high side comparator as a second input.

The output of switching and latching comparator 53 is connected to transistor 20.

A summary of the operation of the liquid level controller can be obtained from FIG. 3. The object of the system is to selectively energize relay system 18 which throws a relay of the contol circuitry to start and stop the pump. See FIG. 1.

Relay system 18 is connected to power supply 12 on one side and to ground through transistor 20 on the other. Transistor 20 is thus the control for energizing relay system 18 and whether transistor 20 activates and completes the circuit through the relay system depends upon the operational state of four comparators, high side comparator 36, low side comparator 38, fault comparator 28, and switching and latching comparator 52. The outputs of these four comparators are, in turn, determined by the input from leads 30 and 32.

High side comparator 36 activates when the oil level rises above high side thermistor 78. When the high side thermistor is submerged, the oil transfers heat away from the self heating thermistor more rapidly than did the air and the temperature of the thermistor drops, increasing its resistance. This increases the voltage taken in by high side comparator 36 from its connection to lead 32 since the power supplied is a substantially constant current and the voltage is therefor directly proportional to the resistance. Under these conditions, the signal voltage taken from lead 32 exceeds the input from power supply 12, and this is the state that activates this comparator. Activated, the high side comparator sends its output to switching comparator 53, activating it which in turn outputs to transistor 20 activating it to complete the circuit containing relay system 18.

As the oil level falls, the high side thermistor is uncovered and does not as readily dissipate the heat it generates. As its temperature rises, the resistance of that thermistor falls and the signal voltage input to the high side comparator falls below the control input, deactivating high side comparator 36, nevertheless, switching and latching comparator 53 remains active by virtue of internal latching means providing a feedback adequate to, under these conditions, maintain the switching and latching comparator active.

However, as the oil level drops further, low side thermistor 79 is uncovered, thereby reducing its resistance. Thus the signal voltage input to low side comparator 38 from lead 30 drops, dropping below the reference voltage provided the low side comparator by power supply 12. These conditions activate low side comparator 38 which generates an output which is fed to switching and latching comparator 53 and overrides the internal latching means and deactivates the switching and latching comparator, thereby shutting off transistor 20 and breaking the circuit necessary to energize relay system 18.

In addition, fault comparator 28 is included to monitor breaks in the thermistors or in their leads 30 and 32. In the event either lead 30 or 32 becomes an open circuit, the voltage input therefrom to fault detector 31 will increase substantially and the output from the fault detector as input to fault comparator 28 exceeds the control voltage input provided to the fault comparator from voltage regulator 24. Under these conditions fault comparator 28 generates an output that illiminates lamp 71 and overrides the internal latching means of switching and latching comparator 53.

Figure 4:
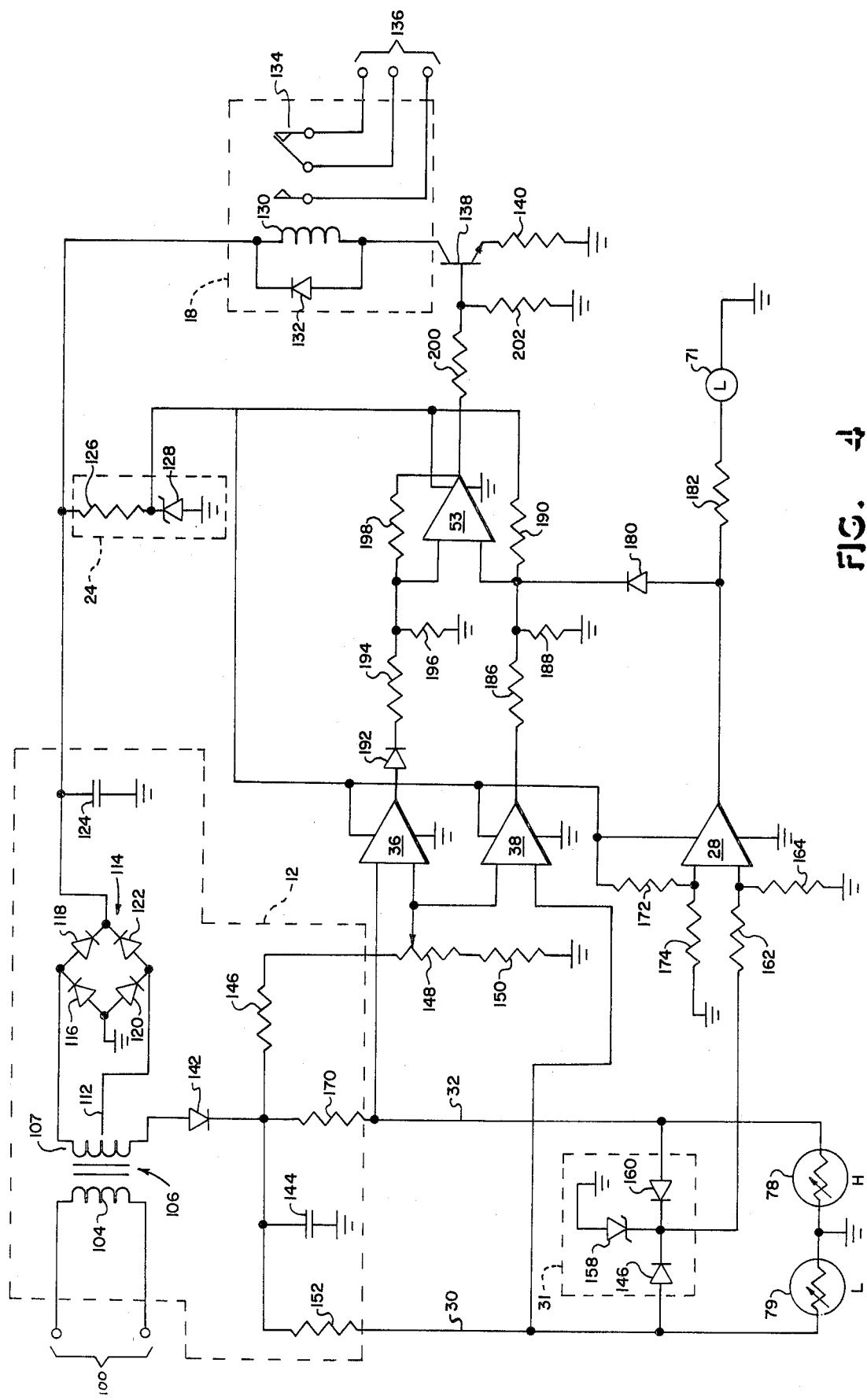
FIG. 4 is a circuit diagram of a liquid level controller constructed in accordance with the present invention.

FIG. 4 is a circuit diagram illustrating the preferred embodiment of liquid level controller 10.

Power supply 12 is shown in dotted outline. Leads 100 provide input to the primary coil of 104 of transformer 106.

Secondary coil 107 is attached on one side to full wave rectifying bridge 114 at the junction of the cathodes of diode 116 and the anode of diode 118. The power supply return is connected at the junction of the anodes of diodes 116 and 120 of rectifier bridge 114. Further, secondary coil 107 is center tapped by lead 112 which is connected to bridge 114 at the junction of the cathode of diode 120 and the anode of diode 122. The output of bridge 114 is located at the junction of the cathodes of diodes 118 and 122 and is connected to ground through filtering capacitor 124, to one side of resistor 126 of voltage regulator 24, and to one side of coil 130. The other side of coil 130 is connected through resistor 140 to ground via the collector and emitter of transistor 138.

Returning to transformer 106, the second side of secondary winding 107 is connected to the anode of diode 142. The cathode of diode 142 is connected to one side of dropping resistor 146, to one side of current limiting resistor 170, to one side of current limiting resistor 152, and to ground through filtering capacitor 144 thereby forming three essentially constant current sources. The other side of resistor 146 is connected to ground through potentiometer resistor 148 in series with resistor 150, and the sliding wire of potentiometer 148 is connected as control input to two operational amplifiers, high side comparator 36 and low side comparator 38. The other side of resistor 170 is connected to high side comparator 36, as variable input, to the anode of diode 160, in fault detector 31 and to ground through high side thermistor 78. Similarly, the other side of resistor 152 is connected to low side comparator 38 as variable input to the anode of diode 156 in fault detector 31, and finally to ground through low side thermistor 79.

The cathode of zener diode 158 is connected to the junction of the cathodes of diodes 146 and 160 and the anode of the zener diode is connected to ground. The output of voltage detector 31 originates at the junction of zener diode 158 and diodes 156 and 160 and is connected through resistor 162 to fault comparator 28 as a variable input, and to one side of resistor 164, the other side of which is grounded.

One end of resistor 172 is connected as a second input to fault comparator 28 and to ground through resistor 174. The other end of resistor 172 is connected to voltage regulator 24 between resistor 126 and the cathode of zener diode 128, the anode of which goes to ground, and to ground itself through comparator 28. Each of these comparators is an operational amplifier that is powered from voltage regulator 24 to ground.

The outputs of comparators 28, 30 and 36 are connected throughout the circuit as follows. Fault comparator 28 is connected to ground through resistor 182 and lamp 71, and connected through blocking diode 180, through resistor 190 to voltage regulator 24 between resistor 126 and zener diode 128 to one side of resistor 188 having its other side grounded, to one side of resistor 186 having its other side connected to the cathode of blocking diode 184, and to switching and latching comparator 53 as input. Low side comparator 38 is connected through resistor 186 to one side of resistors 188 and 190, to the cathode of blocking diode 180, and to switching and latching comparator 53 as input. High side comparator 36 is connected through blocking diode 192 and resistor 194 in series therewith to one side of resistor 196 having its other side grounded, to one side of forward feedback latching resistor 198 and to switching and latching comparator 53, as a second input.

Switching and latching comparator 53 discharges through current limiting resistor 200 to one side of voltage dividing or load resistor 202 having its other side grounded, and to the base of transistor 138.

Returning to relay system 18, unidirection discharge diode 132 is connected across coil 130. It is the object of the whole circuit to analize data concerning the liquid level and to selective energize and denergize coil 130 which throws single pole double throw relay 134 which is adjacent coil 130. Finally, leads 136 of relay 134 serve as means to interface the liquid level controller to the controlling circuitry of a pump.

The following components have been found to produce an effective embodiment of the present invention in connection with appropriately sized passive components. The four operational amplifiers, high side comparator 36, low side comparator 38, fault comparator 28, and switching and latching comparator 53 are conveniently available on a single chip such as National Semi-Conductor LM 2902N. One thermistor model appropriate to the present application is glass probe thermistor model GB 33 P 32 which has a 3K ohm resistance at 25 C and is available through Fenwal Electronics. Further, a npn transistor such as GMPS 2222, available from Motorola, has been found appropirate for transistor 138. These elements, with a 20 volt zener diode at 128 and a 15 volt zener diode at 158 and with other appriately sized passive elements, can be assembled into a liquid level controller in accordance with the present invention.

A more detailed description of the operation of a liquid level controller constructed in accordance with the present invention follows with continued reference to FIG. 4. The four modes of the liquid level controller include the initiation of a pumping cycle, continued running, normal shut off, and fault detection.

Initiation of a Pumping Cycle

Available power is input at leads 100 of transformer 106 to emerge from one side of secondary winding 107 and is connected to one side of Potentiometer or sliding wire resistor 148 through half wave rectifying diode 142, which is associated with capacitor 144 in a voltage multiplying relationship, and through current limiting resistor 146. The other side of potentiometer 148 is grounded through resistor 150 and this assemblage makes the sliding wire of potentiometer 148 a convenient source for an adjustable reference voltage which is input to both comparators 36 and 38. The output tapped from the sliding wire of potentiometer 148 is adjusted to a potential that is bounded on either side by the voltage signals input from a thermistor immersed in oil and a thermistor disipating heat into the air.

This reference voltage input is compared in high side comparator 36 with a voltage signal input from high side thermistor lead 32. High side thermistor 78 is connected to ground on one side and the half-wave rectifier and voltage multiplier arrangement as discussed above, through current limiting resistor 170 on the other side. This arrangement provides an essentially constant current to the thermistor resulting in a direct and proportional relationship of the resistance of the thermistor and the voltage in the lead. Lead 32 is tapped between resistor 170 and thermistor 78 and this input is connected to the high side comparator. When oil covers the high side thermistor, its resistance increases and the voltage rises in the constant current thermistor line and an increased high voltage signal is input to the comparator. At this time the increased voltage signal input from line 32 exceeds that of the reference voltage and the comparator activates.

Comparator 36 is an operational amplifier powered from voltage regulator 24 and, when active, outputs a maximum voltage that is unchecked by feedback loops. This output voltage drops through resistor 194 and is limited by resistor 196 which is grounded, safely limiting the voltage of the increased voltage signal input to switching and latching comparator 53. Under these conditions, the increased voltage signal input from high side comparator 36 clearly exceeds the other input presented to switching and latching comparator 53 and the switch and latching comparator is activated. Its output is current limited through resistor 200 and is limited by voltage divider resistor 202 to a safe level to activate transistor 138 which then passes current from its collector to its emitter. This completes the circuit from power supply 12, through coil 130, and to ground, coil 130 which creates a magnetic field that throws relay 134. Relay 134 is now in a position that activates the primary control circuitry for the pumps, such as magnetic starter 61 of FIG. 1 and the pump begins a pumping cycle.

Continued Running

The operation of the pump causes the liquid level to drop below high side thermistor 78 at the very inception of the pumping cycle and as the resistance of that thermistor falls, the voltage signal input to the high side comparator decreases. The reference voltage is now greater than the decreased or low signal input and this deactivates high side comparator 36, thereby stopping its signal input to switching and latching comparator 53. Without further provision, this condition would deactivate transistor 138, denergizing coil 130, returning relay 134 to an off position, and thereby turn the pump off at the very beginning of the pumping cycle.

However, a feedback loop passing through resistor 198 maintains that comparator active once it has been turned on until such time as an overriding signal is received to turn it off. The feedback loop receives a signal from the output of the switching and latching comparator and brings this latching signal through resistor 198 to input, as limited by voltage dividing resistor 196, back into the switching and latching comparator and thereby maintain that comparator active. Note that blocking diode 192 restricts the feedback to the path described here. With the switching and latching comparator "latched" on, the output of that comparator, here, results in an operation identical to that which turns on the pump when that comparator is activated by an output signal from high side comparator 36.

Normal Shut Off

Low side comparator 38 also receives the reference voltage input from the sliding wire of potentiometer 148 and this reference is compared in low side comparator 38 with a voltage signal input from low side thermistor lead 30. Low side comparator 38 is another operational amplifier powered through voltage regulator 24 and it too is open loop so that a minor change in inputs can precipitate the maximum gain. This use of an open loop operational amplifier results in an essentially temperature insensitive circuit.

Low side thermistor 79 is connected to ground on one side and to the half-wave rectifier and voltage multiplier arrangement as discussed above, through current limiting resistor 152, on the other side. Lead 30 is tapped between resistor 152 and thermistor 79 and this input is connected to the low side comparator. The resistance of low side thermistor 79 decreases when the oil level drops below that thermistor and this decreases the voltage of the constant current in lead 30. At this time the decreased voltage signal input from line 30 falls below the reference voltage input to the low side comparator and the comparator activates.

Activated, the low side comparator outputs its maximum voltage which is current limited through resistor 186 and is in a voltage divider relationship with resistor 188, to join the input from voltage regulator 24 which is dropped through resistor 190, to form an input signal to switching and latching comparator 53. This input signal exceeds the input from the latch discussed above and the switching and latching comparator is deactivated. This turns off transistor 138 and leaves coil 130 in an open circuit. The coil discharges through diode 132 which is set across the coil to allow rapid discharge while preventing damage to transistor 138 from back electromagnetic force developed as the coil's magnetic field collapses. Thus, the relay switch is no longer held on the "on" position and the pump is turned off before it runs dry.

Fault Detection

The preferred embodiment also includes a fault detection system to shut the pump off if either of thermistors 78 or 79 or their lines 32 or 30 respectively, should break.

The signal indicating that such a break has occurred is generated through fault detector 31. There the cathode of anode grounded zener diode 158 is connected at the junction of the cathodes of diodes 156 and 160 which are connected at their respective anodes to thermistor leads 30 and 32, respectively.

Any open circuit in the thermistors or their leads causes an increased potential at the fault detector and zener diode 158 is chosen to breakdown at this additional potential. This message is carried through current limiting resistor 162, across voltage divider resistor 164 and to fault comparator 28.

This detection signal is compared at fault comparator 28 with a reference voltage from voltage regulator 24 and is found to be greater than the latter under fault conditions, activating fault comparator 28. Fault comparator 28 is another open loop operational amplifier powered from voltage regulator 24 and outputting to switching and latching comparator 53. Here the output of activated fault comparator 28 performs the same function that the activated low side comparator does, and similarly turns the pump off. It is also preferred that fault signal output by the comparator illuminate lamp 71 which is separated from the input to the switching and latching comparator by resistor 182. Diode 180 is included on the input line to switching and latching comparator 53 to prevent the output from an activated low side comparator from illuminating the lamp and thereby indicating a fault condition when, in fact, no such condition is present.

The operation of the liquid level controller, as discussed above, makes the present invention convenient and efficient means to maintain a liquid level between upper and lower limits. Further, in the specific stripper well application used to illustrate the operation of the liquid level controller, the present invention conserves energy by limiting unnecessary pumping, increases production by pumping in accordance with actual well conditions, and may be constructed in accordance with this disclosure to do so safely with only low current and low voltage sensing lines.

We claim:

1. Apparatus for controlling the level of a contained liquid by initiating and discontinuing operation of a liquid transfer means mounted to withdraw liquid from the containment, said apparatus comprising:
    a high side thermistor operable in a self heating mode and positionable in said containment at a level substantially equal to the highest level of liquid desired to be permitted therein;
    a low side thermistor operable in a self heating mode and positionable in said containment at a level substantially equal to the lowest level of liquid desired to be permitted therein;
    means for flowing a substantially constant current across said thermistors, whereby when a thermistor operating in a self-heating mode is immersed in liquid it dissipates heat more rapidly than when unimmersed, thus increasing in resistance, and proportionally increasing the voltage drop thereacross above that obtained when a thermistor is unimmersed;
    means for comparing the voltage drops across said thermistors with at least one reference voltage intermediate in value between the voltage drop across unimmersed and immersed thermistors and generating output signals which are a function of said comparison; and
    means responsive to said output signals for switching said liquid transfer means on when said voltage drops across both thermistors are high, indicating that said high side thermistor is immersed, for continuing liquid transfer when said voltage drop across said high side thermistor is low and said voltage drop across said low side comparator is high, indicative of a liquid level between the highest and lowest desired levels, and for switching the liquid transfer means off when said voltage drops are both low, indicating that said low side thermistor is unimmersed.

2. Apparatus for controlling the level of a contained liquid by initiating and discontinuing operation of a liquid transfer means mounted to withdraw liquid from the containment, said apparatus comprising:
    a high side thermistor operable in a self heating mode and positionable in said containment at a level substantially equal to the highest level of liquid desired to be permitted therein;
    a low side thermistor operable in a self heating mode and positionable in said containment at a level substantially equal to the lowest level of liquid desired to be permitted therein;
    means for flowing a substantially constant current across said thermistors, whereby when a thermistor operating in a self-heating mode is immersed in liquid it dissipates heat more rapidly than when unimmersed, thus increasing in resistance, and proportionately increasing the voltage drop thereacross above that obtained when a thermistor is unimmersed;
    means for comparing the voltage drops across said thermistors with at least one reference voltage intermediate in value between the voltage drop across unimmersed and immersed thermistors and generating output signals which are a function of said comparison;
    means responsive to said output signals for switching said liquid transfer means on when said voltage drops across both thermistors are high, indicating that said high side thermistor is immersed, for containing liquid transfer when said voltage drop across said high side thermistor is low and said voltage drop across said low side comparator is high, indicative of a liquid level between the highest and lowest desired levels, and for switching the liquid transfer means off when said voltage drops are both low, indicating that said low side thermistor is unimmersed;
    means for detecting a break in the circuit of either of the thermistors and for generating a detection signal that is a function of this detection;
    means for comparing said detection signal with a reference voltage intermediate in value between the voltage of said detection signal under normal operating conditions and the voltage of the detection signal generated when a break has occurred in the circuit of one of the thermistors and for generating a fault signal that is a function of this comparision; and
    means responsive to said fault signal for switching the power drive of said liquid transfer means off when a break is present in the circuits of either of the thermistors.

3. An apparatus in accordance with claim 2 having means responsive to said fault signal for generating a visually perceptible indication that there is a break in either of the thermistor circuits.

4. An apparatus in accordance with claim 1 wherein said means for comparing voltage drops across said thermistors with reference voltages comprises:
    a high side comparator receiving said voltage drop from said high side thermistor as one input and one of said reference voltage as another input; said high side comparator generating an output signal when said voltage drop exceeds said reference voltage; and
    a low side comparator receiving said voltage drop from said low side thermistor as one input and one of said reference voltages as another input, said low side comparator output signal when said voltage drop falls below said reference voltage.

5. Apparatus for controlling the level of a contained liquid by initiating and discontinuing operation of a liquid transfer means mounted to withdraw liquid from the containment, said apparatus comprising:
- a high side thermistor operable in a self heating mode and positionable in said containment at a level substantially equal to the highest level of liquid desired to be permitted therein;
- a low side thermistor operable in a self heating mode and positionable in said containment at a level substantially equal to the lowest level of liquid desired to be permitted therein;
- means for flowing a substantially constant current across said thermistors, whereby when a thermistor operating in a self-heating mode is immersed in liquid it dissipates heat more rapidly than when unimmersed, thus increasing in resistance, and proportionately increasing the voltage drop thereacross above that obtained when a thermistor is unimmersed;
- means for comparing the voltage drops across said thermistors with at least one reference voltage intermediate in value between the voltage drop across unimmersed and immersed thermistors and generating output signals which are a function of said comparison;
- means responsive to said output signals for switching said liquid transfer means on when said voltage drops across both thermistors are high, indicating that said high side thermistor is immersed, for continuing liquid transfer when said voltage drop across said high side thermistor is low and said voltage drop across said low side comparator is high, indicative of a liquid level between the highest and lowest desired levels, and for switching the liquid transfer means off when said voltage drops are both low, indicating that said low side thermistor is unimmersed;
- said means for comparing voltage drops across said thermistors with reference voltages comprising:
- a high side comparator receiving said voltage drop from said high side thermistor as one input and one of said reference voltages as another input; said high side comparator generating an output signal when said voltage drop exceeds said reference voltage; and
- a low side comparator receiving said voltage drop from said low side thermistor as one input and one of said reference voltages as another input, said low side comparator output signal when said voltage drop falls below said reference voltage;
- said means responsive to said output signals comprising:
- a switching and latching comparator receiving the output signal of said high side comparator as one input and the output signal of said low side comparator as another input; said switching and latching comparator itself generating an output signal which is a function of said inputs; and
- a switching transistor operated upon said output signal from said switching and latching comparator.

6. Apparatus for controlling the level of a contained liquid by initiating and discontinuing operation of a liquid transfer means mounted to withdraw liquid from the containment, said apparatus comprising:
- a high side thermistor operable in a self heating mode and positionable in said containment at a level substantially equal to the highest level of liquid desired to be permitted therein;
- a low side thermistor operable in a self heating mode and positionable in said containment at a level substantially equal to the lowest level of liquid desired to be permitted therein;
- means for flowing a substantially constant current across said thermistors, whereby when a thermistor operating in a self-heating mode is immersed in liquid it dissipates heat more rapidly than when unimmersed, thus increasing in resistance, and proportionally increasing the voltage drop thereacross above that obtained when a thermistor is unimmersed;
- means for comparing the voltage drops across said thermistors with at least one reference voltage intermediate in value between the voltage drop across unimmersed and immersed thermistors and generating output signals which are a function of said comparison;
- means responsive to said output signals for switching said liquid transfer means on when said voltage drops across both thermistors are high, indicating that said high side thermistor is immersed, for continuing liquid transfer when said voltage drop across said high side thermistor is low and said voltage drop across said low side comparator is high, indicative of a liquid level between the highest and lowest desired levels, and for switching the liquid transfer means off when said voltage drops are both low, indicating that said low side thermistor is unimmersed;
- said means for comparing voltage drops across said thermistors with reference voltages comprising:
- a high side comparator receiving said voltage drop from said high side thermistor as one input and one of said reference voltages as another input; said high side comparator generating an output signal when said voltage drop exceeds said reference voltage; and
- a low side comparator receiving said voltage drop from said low side thermistor as one input and one of said reference voltages as another input, said low side comparator output signal when said voltage drop falls below said reference voltage;
- said means for comparing said detection signal with a reference voltage comprising
- a fault comparator receiving said detection signal from said means for detecting a break as one input and said reference voltage as another input, said fault comparator generating an output fault signal when said detection signal exceeds said reference voltage.

7. An apparatus in accordance with claim 6 wherein said means responsive to said output signals comprises:
- a switching and latching comparator receiving the output signal of said high side comparator as one input and the output signals of said low side comparator and fault comparator as another input, said switching and latching comparator itself generating an output signal which is a function of said inputs; and
- a switching transistor operated upon said output signal from said switching and latching comparator.

8. A method for controlling the level of a contained liquid by initiating and discontinuing operation of a liquid transfer means mounted to withdraw liquid from the containment, said apparatus comprising:

positioning a high side thermistor operable in a self heating mode in said containment at a level substantially equal to the highest level of liquid desired to be permitted therein;

positioning a low side thermistor operable in a self heating mode in said containment at a level substantially equal to the lowest level of liquid desired to be permitted therein;

flowing a substantially constant current across said thermistors, where by when a thermistor operating in a self-heating mode is immersed in liquid it dissipates heat more rapidly than when unimmersed, thus increasing in resistance, and proportionally increasing the voltage drop thereacross above that obtained when a thermistor is unimmersed;

comparing the voltage drops across said thermistors with a reference voltage intermediate in value between the voltage drop across unimmersed and immersed thermistors and generating signals which are a function of said comparison; and switching the said liquid transfer means on when said voltage drops across both thermistors are high, indicating that said high side thermistor is immersed, continuing liquid transfer when said voltage drop across said high side thermistor is low and said voltage drop across said low side comparator is high, indicative of a liquid level between the highest and lowest desired levels, and switching the liquid transfer means off when said voltage drops are both low, indicating that said low side thermistor is unimmersed.

9. A method for controlling the level of a contained liquid by initiating and discontinuing operation of a liquid transfer means mounted to withdraw liquid from the containment, said apparatus comprising:

positioning a high side thermistor operable in a self heating mode in said containment at a level substantially equal to the highest level of liquid desired to be permitted therein;

positioning a low side thermistor operable in a self heating mode in said containment at a level substantially equal to the lowest level of liquid desired to be permitted therein;

flowing a substantially constant current across said thermistors, whereby when a thermistor operating in a self-heating mode is immersed in liquid it dissipates heat more rapidly than when unimmersed, thus increasing in resistance, and proportionally increasing the voltage drop thereacross above that obtained when a thermistor is unimmersed;

comparing the voltage drops across said thermistors with a reference voltage intermediate in value between the voltage drop across unimmersed and immersed thermistors and generating signals which are a function of said comparison;

switching the said liquid transfer means on when said voltage drops across both thermistors are high, indicating that said high side thermistor is immersed, continuing liquid transfer when said voltage drop across said high side themistor is low and said voltage drop across said low side comparator is high, indicative of a liquid level between the highest and lowest desired levels, and switching the liquid trnsfer means off when said voltage drops are both low, indicating that said low side thermistor is unimmersed;

detecting a break in the circuit of one of the thermistors, should a break occur, by generating a detection signal that is a function of this detection;

commparing said detection signal with a reference voltage intermediate in value between the voltage of said detection signal under normal operating conditions and the voltage of the detection signal generated when a break has occurred in the circuit of one of the thermistors and generating a fault signal that is a function of this comparison;

switching the power drive of said liquid transfer means off when a break is present in the circuit of one of the thermistors; and generating a visually perceptible indication that there is a break in one of the thermistor circuits upon generation of said fault signal.

10. An apparatus for controlling the level of a contained liquid by initiating and discontinuing operation of a power driven pump mounted to withdraw liquid from the containment, said apparatus comprising:

a power supply having at least a first and second substantially constant current outputs and a common return;

a high side thermistor operable in a self heating mode and positionable in said containment at a level substantially equal to the highest level of liquid desired to be permitted therein, said high thermistor being connected between said first constant current output of said power supply and said common return; whereby, when said high side thermistor is operating in a self heat mode and is immersed in liquid, it dissipates heat more rapidly than when unimmersed, thus increasing in resistance and proportionally increasing the voltage drop thereacross above that obtained when said high side thermistor is unimmersed;

a low side thermistor operable in a self heating mode and positionable in said containment at a level substantially equal to the lowest level of liquid desired to be permitted therein, said low side thermistor being connected between said second constant current output of said power supply and said common current return; whereby, when said low side thermistor is operating in a self heating mode and the liquid level drips below it, the low side thermistor dissipates heat less rapidly than when immersed, thus decreasing the voltage drop thereacross below that obtained when said low side thermistor is immersed;

means for establishing at least one substantially constant reference voltage;

a first input comparing operational amplifier comprising a a high side comparator, said first operational amplifier receiving said voltage drop across said high side thermistor as one input and said reference voltage as another input, said first operational amplifier being powered independently from said inputs and generating an output signal indicating that said high side thermistor is immersed;

a second input comparator comprising a low side comparator, said operational amplifier receiving said voltage drop across said low side thermistor as one input and a reference voltage as another input, said second operational amplifier being powered independently from said inputs, and generating an output signal indicating that said low side thermistor is immersed;

a third operational amplifier comprising a switching and latching comparator, said operational amplifier receiving said output signals from said first operational amplifier as one input and from said second operational amplifier as another input, said third operational amplifier being powered independently from said input and generating an output that is a function of at least the output of said first and second operational amplifier and thereby of the liquid level itself;

a switching transistor receiving the output signal from said third operational amplifier, its operational state being a function of said output signal, whereby said switching transistor, operates to switch a power circuit from an open circuit to a completed, energized circuit;

a coil positioned on said power circuit of said switching transistor; whereby said coil is energized when said power circuit is completed; and a relay operable by said coil, said relay switch controlling said power driven pump.

11. An apparatus in accordance with claim 10 further comprising:

means for detecting a break in the circuit of either of the thermistor circuits and sending a fault detection signal;

a fourth input comparing operational amplifier comprising fault comparator, said fourth operational amplifier receiving said fault detection signal as one input and a third reference voltage as another input, said fourth operational amplifier being powered independently from said input and generating an output fault signal to said switching and latching comparator where it is received as another input, whereby the output signal of said switching and latching comparator is also function of said output fault signals; and a lamp indicator responsive to said output fault signal.

12. A liquid level controller in accordance with claim 10 wherein said first and second operational amlifers are open loop whereby a minimum change in the voltage inputs produces a maximum change in the voltage outputs and renders the processing components substantially temperature insensitive; and wherein said third operational amplifier has a forward feedback circuit receiving an output signal from said third operational amplifier and returning an input to said third operational amplifier, whereby the output of said third operational amplifier is a function of at least this feedback input and of the output signals of the high side and low side comparators.

13. A liquid level controller in accordance with claim 12 wherein the input from said forward feedback circuit joins the output signal of said first operational amplifier and is isolated from reading said first operational amplifier by a blocking diode.

* * * * *

UNITED STATES PATENT AND TRADEMARK OFFICE
CERTIFICATE OF CORRECTION

PATENT NO. : 4,392,782
DATED : July 12, 1983
INVENTOR(S) : Andrew Kuehn, III, Edwin G. Hoefs It is certified that error appears in the above-identified patent and that said Letters Patent are hereby corrected as shown below:

In the listing of the Assignee, please delete [Comact] and insert Camact.

Signed and Sealed this

Twenty-fifth Day of October 1983

[SEAL]

Attest:

GERALD J. MOSSINGHOFF

Attesting Officer     Commissioner of Patents and Trademarks